Feb. 25, 1958  R. J. TRAUPMANN  2,824,381
PRE-INDICATOR OF PIPE POSITIONS AND BENDS
Filed April 29, 1955
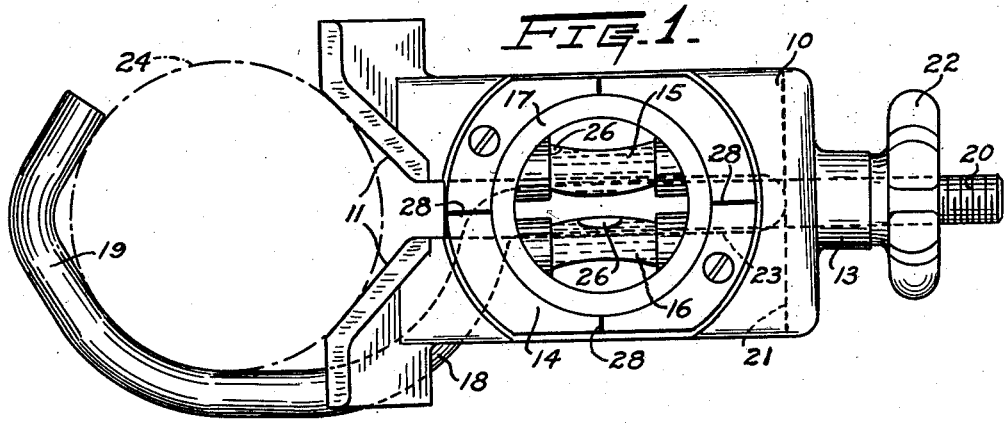
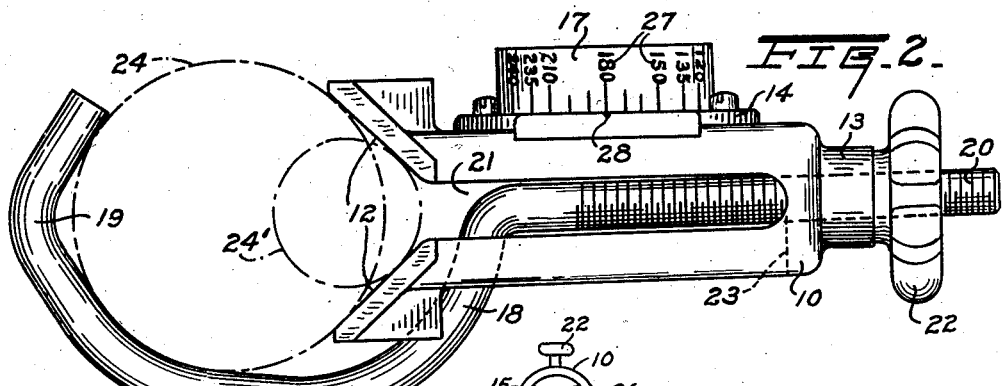
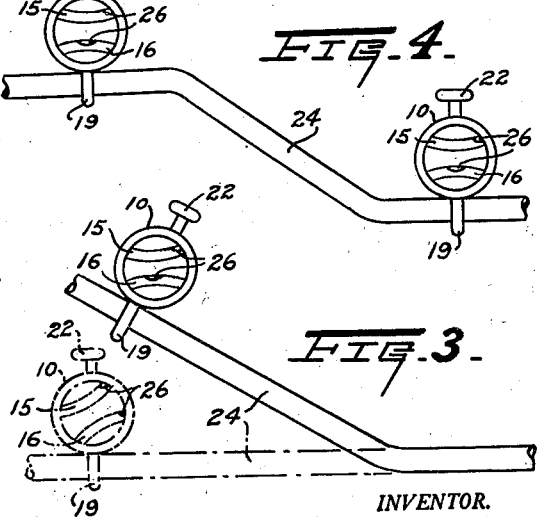
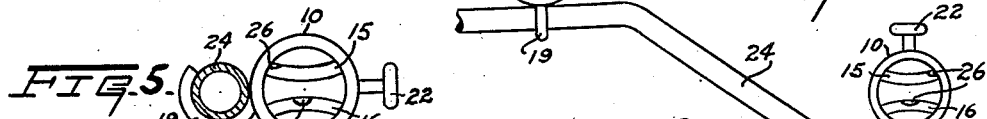
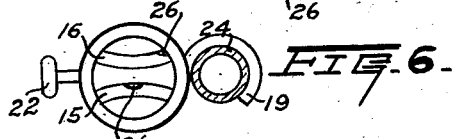
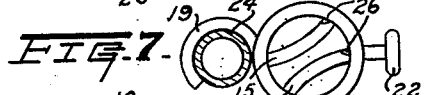
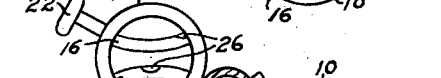
INVENTOR.
R. J. Traupmann
BY
Lieber & Lieber
ATTORNEYS.

United States Patent Office 2,824,381
Patented Feb. 25, 1958

2,824,381

PRE-INDICATOR OF PIPE POSITIONS AND BENDS

Raymond J. Traupmann, Wauwatosa, Wis., assignor to Blackhawk Mfg. Co., West Allis, Wis., a corporation of Wisconsin Application April 29, 1955, Serial No. 504,743

6 Claims. (Cl. 33—207)

This invention relates in general to improvements in the art of pre-determinating the extent of displacement, deformation or angularity to be attained by an anticipated subsequent operation upon elongated elements or portions thereof, and relates more specifically to an improved method of and apparatus for accurately pre-indicating the angular displacement to which an elongated member such as a pipe or shaft-like element is to be subsequently inclined, bent, or otherwise displaced.

The primary object of the present invention is to provide a simple method of accurately pre-indicating desired changes in characteristics of elongated elements such as pipes or rods with the aid of readily manipulable apparatus.

It is frequently desired to change certain characteristics of tubes, rods and other elongated elements, such as accurately bending such an element to a definite angle, or making multiple bends to create an offset lying in a desired plane and having the several bends of accurate angularity with respect to each other, or to produce a slope of definite inclination in the element. Such operations have heretofore been effected with the aid of a variety of tools such as wrenches, pipe-benders, and the like, which may by tedious manipulation be utilized to occasionally effect the desired results but are by no means dependable in order to accurately reproduce such results with extreme precision. The reason for this lack of precision in the past, is that no means were available for definitely predetermining or pre-indicating the final result desired and for accurately showing when such results have been attained. The prior methods used for such purposes were all of the cut-and-try type requiring the services of expert mechanics, and therefore could not be carried by on a novice. Then too, when it becomes desirable to bend a pipe relative to its central axis to a definite angle, any reliable type of pipe bender may be employed to effect bending to the approximate angle desired, but when the bending force is released the spring in the pipe frequently causes the angle to change thereby preventing final bending with utmost precision.

It is therefore an important object of this invention to provide an improved method of obviating all of the above mentioned difficulties and inaccuracies when bending a pipe or rod element relative to its axis or in a plane.

Another important object of the invention is to provide a simple precision implement for facilitating commercial exploitation of the improved method, and which is extremely flexible in its adaptations.

A further important object of my invention is to provide an improved method of utilizing one or more spirit levels for the purpose of predetermining and indicating the final accomplishment of diverse changes in characteristics or in the position of elongated elements such as pipes, tubes, rods, bars or the like, and which changes may be effected with ordinary tools such as wrenches, levers or pipe and tube benders.

Still another important object of the present invention is to provide an improved device embodying a spirit level which is attachable to a pipe or the like and is rotatably adjustable about an axis extending transversely of the pipe axis, in a manner whereby subsequent bending of the pipe to any desired angle will cause the level to register zero or level reading, upon attainment of the angular pre-setting of the instrument.

An additional important object of the invention is to provide an improved device embodying a spirit level which is attachable to a pipe or the like and is rotatably adjustable about an axis disposed parallel to the pipe axis, in a manner whereby subsequent rotation of the pipe axis through any desired angle will cause the level to register zero or level reading, upon attainment of the pre-setting of the instrument.

These and other more specific objects and advantages of the invention will be apparent from the following detailed description.

A clear conception of the several steps involved in the improved method, and of the construction and usage of a practical implement for facilitating exploitation of the method, may be had by referring to the drawing accompanying and forming a part of this specification in which like reference characters designate the same or similar parts in the various views.

Fig. 1 is a front view of the improved indicator or implement viewed in alignement with the axis of rotary adjustment of a pair of spirit levels mounted thereon, and showing the device applied to a pipe shown in dot-and-dash lines, with the adjustment axis of the level disposed parallel to the pipe axis;

Fig. 2 is a side elevation of the same indicator or implement viewed transversely of the level adjustment axis, and showing the device applied to a pipe also shown in dot-and-dash lines, but with the adjustment axis of the levels disposed transversely of the pipe axis;

Fig. 3 is a diagram illustrating the use of the improved implement in producing a 30° pipe bend;

Fig. 4 is a similar diagram illustrating the use of several of the implements when producing parallel location of several pipe sections connected by an intervening angular section;

Figs. 5 and 6 are other diagrams illustrating the use of the improved implement when producing 180° rotative displacement or twisting of a pipe about its longitudinal axis; and Figs. 7 and 8 are similar diagrams illustrating the use of the same implement when producing other than 180° rotative displacement or twisting of a pipe about its longitudinal axis.

While the invention has been shown and described herein as having been embodied in an implement provided with a pair of complementary spirit levels and which is advantageously applicable for the purpose of pre-indicating a condition of a pipe or tube, it is not intended to unnecessarily restrict the device to the provision of duplex levels or to usage in connection with tubular elements. It is also contemplated that specific descriptive terms used herein be given the broadest possible interpretation consistent with the disclosure, and in this connection it is intended that the word pipe shall include any elongated element such as a tube, rod or bar of any transverse cross-section.

Referring to Figs. 1 and 2 of the drawing, the improved indicator shown therein, comprises in general, a bifurcated main frame 10 having two sets of angular or V-shaped pipe engaging surfaces 11, 12 at one end, and a bored hub 13 at its opposite end, while the medial portion of one of its walls is provided with a bearing 14 the central axis of which is disposed parallel to the V-surfaces 11; a complementary pair of spirit levels 15, 16 carried by a peripherally calibrated ring 17 on opposite sides of the bearing axis and which ring is rotatively adjustable within the frame bearing; and a pipe clamping member 18 having a hook 19 at one end while its opposite end 20 extends through the frame bifurcation 21 and hub 13 and is provided with screw threads coacting with a hand wheel 22.

The main frame 10 may be formed of any durable but light metal such as aluminum, and the bifurcation 21 of this frame is disposed in a plane perpendicular to the axis of the bearing 14. In addition to the bifurcation 21, the frame 10 is also provided with an elongated slot 23 in its wall remote from the bearing 14, this slot being disposed centrally of the bearing 14 and perpendicular to the plane of the bifurcation 21. The hook 19 of the clamping member 18 is adapted to be positioned within the frame bifurcation 21 when clamping a pipe 24 against the set of V-surfaces 11 as in Fig. 1, and to be confined within the frame slot 23 when clamping such a pipe 24 against the set of V-surfaces 12 as in Fig. 2, and the surfaces 11, 12 of the two sets are disposed perpendicular to each other and are formed to alternately position the pipe axis either in the plane of the slot 23 or in the plane of the bifurcation 21 as illustrated in Figs. 1 and 2 respectively.

The V-surfaces 11, 12 and the hook member 18 are adapted to clampingly coact with pipes 24, 24' of various diameters as depicted in dot-and-dash lines in Fig. 2, and each of the spirit levels 15, 16 consists of a slightly bent or bowed tube substantially filled with liquid except for an air bubble 26 which is adapted to assume zero or level position at the upwardly bowed side of its confining tube when the latter is levelled. These two complementary levels 15, 16 are permanently mounted in the ring 17 with the tubes thereof located on opposite sides of the ring axis and bowed toward each other as shown in somewhat exaggerated condition in Fig. 1, and with the levels thus mounted, the bubble 26 of the lower level 16 will assume mid-position when the frame 10 is disposed as shown but the bubble 26 of the other level 15 will assume mid-position when either the frame 10 or the ring 17 is rotated 180° about the ring axis. Whenever one of the bubbles 26 is in zero or level position, the bubble of the other level will be almost invisible, so that no confusion in readings can possibly result.

The level supporting ring 17 is calibrated with indicia 27 representing 360°, and these peripheral indicia 27 are interchangeably cooperable with several fixed radial markers 28 on the flange of the bearing 14, thus permitting the implement to be disposed in various initial positions relative to the pipes 24. The ring 17 is frictionally retained in different positions of adjustment, and the hand wheel 22 which coacts with the threaded end 20 of the clamping member 18 may be readily manipulated to firmly clamp the implement to a pipe 24, but may also be retracted sufficiently to permit the hook 19 to be shifted from within the frame bifurcation 21 into the slot 23 and vice versa. The accurate construction and formation of all parts of the implement is very important in order to insure utmost precision in performance, and the properly assembled unit is susceptible of many uses when carrying on the improved method.

The diagram of Fig. 3 illustrates the method of using the improved implement in order to facilitate accurate bending of a pipe to a 30° angle. After the implement frame 10 has been firmly clamped to the initially straight pipe with the aid of the hook 19 and hand wheel 22 as shown in dot-and-dash lines, the ring 17 should be rotated to cause the spirit levels 15, 16 to assume a 30° angle relative to the axis of the pipe, as determined by the calibrations 27 on the ring. The pipe 24 may then be bent with any suitable type of pipe and rod bender until the air bubble 26 in the lower spirit level 16 assumes level or mid-position as shown in solid lines, thereby completing the bending operation with the pipe 24 accurately bent to a 30° angle. Any straight pipe 24 may obviously be bent in like manner to any desired angle by proper adjustment of the ring 17 and levels 15, 16.

The diagram of Fig. 4 illustrates the method of utilizing several of the improved implements in order to obtain parallel end sections in a pipe 24 having an intermediate inclined section connecting the end sections. When performing such operation one of the indicators may be clamped in upright position to each of the end sections of the pipe 24 which are to ultimately assume parallel disposition. The level supporting rings 17 of the two indicating devices should be set to zero reading with the bubble 26 of the level 16 of one of the indicator units in mid-position, while the bubble 26 of the corresponding level 16 of the other implement may be considerably off center. The angularity of the bent medial section of the pipe 24 may thereafter be varied in any suitable manner to cause the bubbles 26 of the levels 16 of both indicators to assume mid-position, thereby accurately disposing both of the end sections of the pipe in parallelism.

The diagrams of Figs. 5 and 6 illustrate the method of using the improved implement in order to effect accurate rotation of a pipe 24 through an 180° angle about its longitudinal axis. Here one of the indicator units should be initially clamped to the pipe 24 as shown in Fig. 5, with the bubble 26 of the lower level 16 in mid-position while the corresponding bubble 26 of the upper level 16 is off-center. The pipe 24 may thereafter be rotated about its central axis until the bubble 26 of the level 15 attains mid-position while the bubble 26 of the other level 16 moves off-center, whereupon the pipe 24 will have reached its desired position accurately rotated 180° from its initial position. Such rotation of the pipe 24 may obviously be effected with the aid of an ordinary pipe wrench or the like.

The diagrams of Figs. 7 and 8 illustrate the method of using one of the improved implements to effect rotation of a pipe 24 either less or more than 180° about its longitudinal axis. With the same 30° initial setting of the adjusting ring, the pipe 24 may be rotated either 150° as shown in solid lines, or 330° as shown in dot-and-dash lines. When the indicator is initially adjusted as in Fig. 7 the levels 15, 16 will be inclined 30° relative to horizontal position and both bubbles 26 will be off-center, and as the pipe 24 is subsequently rotated 150° the bubble 26 of the level 15 will centralize, whereas continued rotation of the pipe will cause the bubble 26 of the other level 16 to centralize. This 30° adjustment may of course be varied throughout a considerable range to produce the same accurate results.

These typical uses of the improved indicator are only a few of many available usages, and the various adjustments of the level supporting ring 17 can be quickly and accurately predetermined with the aid of the calibrations 27 coacting with the markers 28 on the frame bearing 14. The improved device may be effectively utilized either in making reverse bends 180° apart, in making reverse bends less than 180° apart, or in making bends of greater radius than those which the bender is capable of normally producing with a single stroke; and it may be likewise used to make successive bends in a common plane. The frame 10 may also be conveniently applied to the pipes 24, 24' of various diameters with the axis of the level mounting ring 17 accurately disposed either parallel or perpendicular relative to the plane of the pipe axis, with the aid of the frame V-surfaces 11, 12, the clamping member 18, and the hand wheel 22, and the pre-indicating units may be utilized in conjunction with straight-edges and with any suitable pipe benders and pipe wrenches in order to insure accurate final results.

The use of a pair of bowed levels 15, 16 is important in obtaining precision results especially when pipes are bent or rotated to extents of 180° or more; and the bowed tubes of such spirit levels permit the bubbles 26 to more readily assume accurate central or mid-positions. These levels may be set to zero or level reading for any angular setting of the instrument, and can also be pre-set to any angle which will ultimately result in zero reading when the work has been accomplished. The various elements of the improved indicating device can also be readily constructed, assembled and adjusted to meet various operating conditions and at very moderate cost, and these improved angle or final position predetermining units are extremely useful as accessories for any of the commercial pipe benders and other pipe positioning and deforming equipment. The improved indicating appliance has proven highly satisfactory and successful in actual use and carries on the successive steps of the improved method with utmost precision.

It should be understood that it is not desired to limit this invention to the exact steps of the method or to the precise details of construction of the implement herein shown and described, for various modifications within the scope of the appended claims may occur to persons skilled in the art.

I claim:

1. In an implement for indicating characteristics of elongated pipes or the like, a frame provided with two crossing V-shaped pipe engaging recesses having apices intersecting at a point, a hook alternatively cooperable with said recesses to clamp pipes therein and having a shank the axis of which passes through said point and which is adjustably cooperable with said frame to move the hook into clamping position, a spirit level rotatable upon said frame about an axis which intersects said shank axis, and angle designating indicia interposed between said level and said frame.

2. In an implement for indicating characteristics of elongated pipes or the like, a frame provided with two crossing V-shaped pipe engaging recesses having apices intersecting at a point, a hook alternatively cooperable with said recesses to clamp pipes therein and having a shank the axis of which passes through said point and which is adjustably cooperable with said frame to move the hook into clamping position, a pair of oppositely bowed spirit levels journalled for rotation upon said frame about an intervening axis which intersects and is perpendicular to said shank axis, and angle designating indicia interposed between said levels and said frame.

3. In an implement for indicating characteristics of elongated pipes or the like, an elongated frame provided at one end with two crossing V-shaped pipe engaging recesses each medially interrupted by a slot extending toward the opposite end of the frame, a hook alternatively cooperable with said recesses and with said slots to clamp pipes against the frame, said hook having a shank extending along said slots and which is adjustably cooperable with said opposite frame end to move the hook into clamping position, a spirit level rotatable upon a medial portion of said frame, and angle designating indicia interposed between said level and said frame.

4. In an implement for indicating characteristics of elongated pipes or the like, an elongated frame provided at one end with two crossing V-shaped pipe engaging recesses each medially interrupted by a slot extending toward the opposite end of the frame, a hook alternatively cooperable with said recesses and with said slots to clamp pipes against the frame, said hook having a shank extending along said slots and which is adjustably cooperable with said opposite frame end and to move the hook into clamping position, a pair of alternately operable spirit levels journalled for rotation upon the medial portion of said frame about an axis which intersects said shank, and angle designating indicia interposed between said levels and said frame.

5. In an implement for indicating characteristics of elongated pipes or the like, a frame provided at one end with intersecting V-shaped pipe engaging recesses each of which is medially interrupted by a slot extending away from said frame end, a hook having a shank adjustably cooperable with the opposite end of said frame and extending along said slots, said hook also having a pipe clamping portion at the end of said shank remote from said opposite frame end and which portion is alternatively cooperable with said slots to position said clamping portions normal to alternate recesses, a rotatably adjustable spirit level carried by said frame, and angle designating indicia interposed between said level and said frame.

6. In an implement for indicating characteristics of elongated pipes or the like, a frame provided at one end with intersecting pipe engaging recesses each of which is medially interrupted by a slot extending toward the opposite frame end, a hook having a rectilinear shank extending along said slots and adjustably secured to the opposite frame end and also having a pipe engaging hook portion alternatively cooperable with said slots to position the hook portion for alternate pipe clamping co-action with said recesses, a spirit level angularly adjustably secured to said frame laterally of said slots, and angle designating indicia interposed between said level and said frame.

References Cited in the file of this patent

UNITED STATES PATENTS

| | | |
|---|---|---|
| 352,721 | Traut | Nov. 16, 1886 |
| 449,609 | Green | Mar. 31, 1891 |
| 1,927,504 | Rudolff | Sept. 19, 1933 |
| 2,129,695 | Karnes | Sept. 13, 1938 |
| 2,468,907 | Wilson et al. | May 3, 1949 |
| 2,659,975 | Van Gundy | Nov. 24, 1953 |
| 2,660,804 | Mundy | Dec. 1, 1953 |

FOREIGN PATENTS

| | | |
|---|---|---|
| 20,928 | Great Britain | Sept. 20, 1907 |
| 3,471 | Great Britain | Mar. 4, 1915 |